C. DEIS.
Grain Drill.
No. 77,009. Patented April 21, 1868.
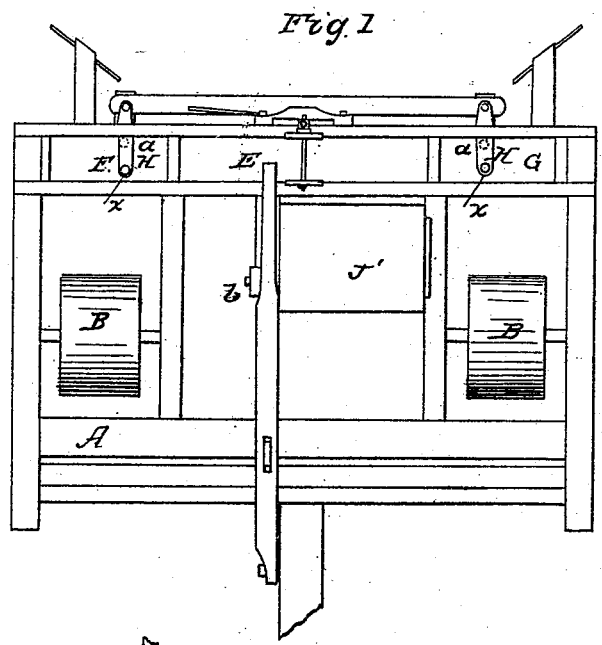
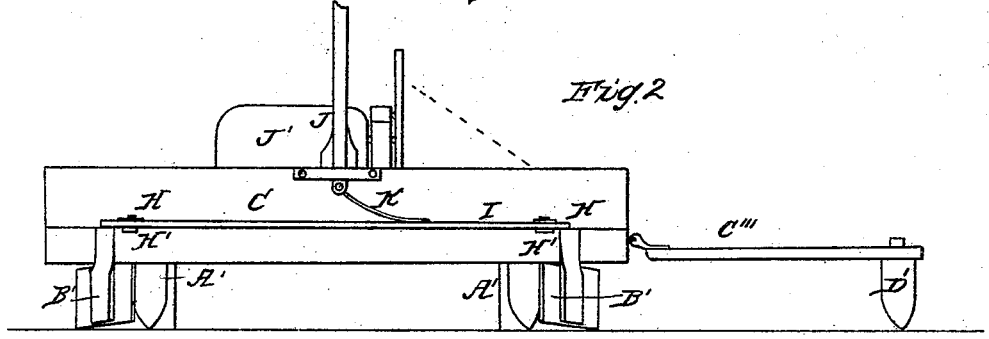
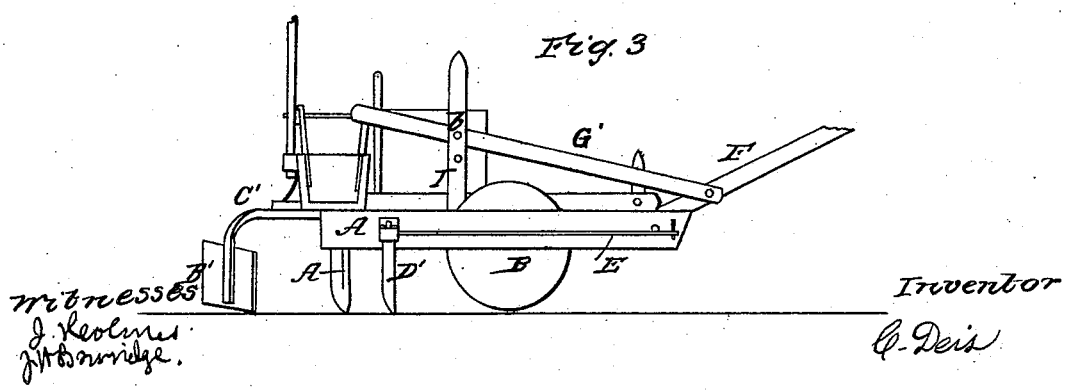

United States Patent Office.

C. DEIS, OF CANAL DOVER, OHIO.

Letters Patent No. 77,009, dated April 21, 1868.

IMPROVEMENT IN SEEDING-MACHINE.

*The Schedule referred to in these Letters Patent and making part of the same.*

TO ALL WHOM IT MAY CONCERN:

Be it known that I, C. DEIS, of Canal Dover, in the county of Tuscarawas, and State of Ohio, have invented certain new and useful Improvements in Seeding-Machines; and I do hereby declare that the following is a full and complete description of the same, reference being had to the accompanying drawings, making a part of this specification, in which—

Figure 1 is a top view of the machine.
Figure 2 is a view of the rear side.
Figure 3 is an end view.
Like letters of reference refer to like parts in the views.

In fig. 1, A represents a frame, mounted upon the rollers B. At the rear end of the frame is a seed-box, C, divided into three compartments, E F G, fig. 1. In the bottom of each end-compartment is an opening, indicated by the dotted line $a$, through which the seed is allowed to drop to the ground, as will hereafter be shown.

H, fig. 1, are slides, by which the holes referred to are closed. Below the hole is also a slide, H', thereby placing the bottom of the box between two slides. The slides are pivoted to the box at the point $x$, and are connected to each other by a link, I, and by which the slides are operated by the lever J, attached to the same by a rod, K. The arrangement of the slides is such that, when the hole is opened at the top, it will be closed by the slide below, and when the lower slides are from over the hole, the upper slides will cover the hole. The capacity of this hole is equal to the holding of four or five grains of corn—enough to be dropped in one hill.

Projecting below the frame, and a little in advance of each hole, is a foot, A'. Following this, at a certain distance, is a hoe or share, B', attached to the machine by a curved arm, C'.

Extending from one or both ends of the machine is a beam, C'', fig. 2, one end of which is hinged to the machine, and the other is provided with a foot, D'. The other end of the beam is attached to the frame by a rod, E', which serves as a brace, and by which the outer end is drawn.

F' is the tongue by which the machine is drawn, and is made rigid or flexed by the lever G', one end of which is pivoted to the tongue, from which it reaches back to a standard, I', and secured to the same by the pins $b$.

The practical operation of this machine is as follows:

The operator takes his place upon the seat J', and starts off in the line of work; the rollers crush down the lumps of dirt, and level the ground for the markers or feet A', leaving it smooth and flat. The feet, as they follow the roller, furrow the ground, into which the seed is dropped from the box, at regular and equal distances, by operating the lever J, which causes the slides to move from over the holes above referred to, and through which the seeds fall to the ground, four or five grains to each hill, the hole being of a capacity to hold that number only. The seed, on being dropped in the furrow, is then covered by the hoe or share B', which completes the operation.

The foot D serves as a guide to govern the direction of the machine. Thus, as the machine moves along, the foot follows, a row thereby indicating the distance that the machine must be kept from it, so that every row can be planted at a uniform distance from each other.

This machine may also be used simply as a marker for planting, by removing the hoes or shares, using the feet only, which will make three or more marks, of a uniform and equal distance from each other.

What I claim as my improvement, and desire to secure by Letters Patent, is—

1. The combination and arrangement of the rollers B, foot A', and share B', in the manner as and for the purpose specified.

2. The slides H H', in combination with the box C, when operated in the manner and for the purpose substantially as set forth.

C. DEIS.

Witnesses:
    A. WILHELMS,
    S. W. CROXTON.